US012600154B2

(12) United States Patent
Sone

(10) Patent No.: US 12,600,154 B2
(45) Date of Patent: Apr. 14, 2026

(54) PRINTER APPARATUS

(71) Applicant: Toshiba Tec Kabushiki Kaisha, Tokyo (JP)

(72) Inventor: Toshihiro Sone, Yokohama Kanagawa (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 132 days.

(21) Appl. No.: 18/416,282

(22) Filed: Jan. 18, 2024

(65) Prior Publication Data

US 2024/0351358 A1 Oct. 24, 2024

(30) Foreign Application Priority Data

Apr. 24, 2023 (JP) ................................ 2023-071032

(51) Int. Cl.
*B41J 33/06* (2006.01)
*B41J 33/00* (2006.01)
*B41J 35/06* (2006.01)

(52) U.S. Cl.
CPC ............ *B41J 33/06* (2013.01); *B41J 33/003* (2013.01); *B41J 35/06* (2013.01); *B41J 2202/31* (2013.01)

(58) Field of Classification Search
CPC .. B41F 16/00; B41J 2/315; B41J 2/325; B41J 33/06; B41J 33/003; B41J 35/06; B41J 33/14; B41J 2202/31; B41J 17/28; B41J 17/30; B41M 5/00
See application file for complete search history.

(56) References Cited

U.S. PATENT DOCUMENTS

| | | | | |
|---|---|---|---|---|
| 6,157,399 | A | 12/2000 | Miyaji et al. | |
| 6,380,964 | B1 | 4/2002 | Tanaka | |
| 6,585,437 | B1 * | 7/2003 | Wiklof | B65C 11/0289 400/621 |
| 10,647,139 | B1 | 5/2020 | Kitahara | |
| 2005/0195269 | A1 | 9/2005 | Abe et al. | |

FOREIGN PATENT DOCUMENTS

| | | | |
|---|---|---|---|
| JP | H0634958 | U | 5/1994 |
| JP | H07-89171 | A | 4/1995 |
| JP | H07227981 | A | 8/1995 |
| JP | 2000062270 | A | 2/2000 |

OTHER PUBLICATIONS

Extended European Search Report mailed May 8, 2024 in corresponding European Patent Application No. 24154218.2, 7 pages.
Notice of Reasons for Refusal (First Office Action) mailed Dec. 16, 2025 in corresponding Japanese Patent Application No. 2023-071032, with English machine translation, 6 pages.

* cited by examiner

*Primary Examiner* — Kristal Feggins
(74) *Attorney, Agent, or Firm* — Kim & Stewart LLP

(57) ABSTRACT

According to an embodiment, a printer apparatus includes a guide member that guides an ink ribbon and a print sheet nipped by a thermal head and a platen roller and guides only the ink ribbon after the printing towards the winding reel. The printer apparatus further includes a sheet-like elastic member attached to a surface of surfaces in contact with the ink ribbon of the guide member, the surface guiding only the ink ribbon after the printing towards the winding reel.

11 Claims, 6 Drawing Sheets

| | Rubber thickness t (mm) | Soft ⟵ Rubber hardness H (°) ⟶ Hard | | | | | | | |
|---|---|---|---|---|---|---|---|---|---|
| | | 35 | 40 | 45 | 50 | 55 | 60 | 65 | 70 |
| Without EPDM rubber | 0 | × | | | | | | | |
| With EPDM rubber | 0.5 | △ | ○ | ○ | ○ | ○ | ○ | × | × |
| | 1 | △ | △ | ○ | ○ | ○ | ○ | × | × |
| | 1.5 | × | △ | ○ | ○ | ○ | ○ | × | × |
| | 2 | × | △ | ○ | ○ | ○ | ○ | ○ | × |
| | 2.5 | × | × | × | × | × | ○ | ○ | × |
| | 3 | × | × | × | × | × | × | × | × |

○ No defect images were generated
△ Defect image was generated at end of life (silicon stuck to rubber)
× Defect image was generated

Fig.4

PRINTER APPARATUS

CROSS-REFERENCE TO RELATED APPLICATIONS

This application is based upon and claims the benefit of priority from the prior Japanese Patent Application No. 2023-71032, filed on Apr. 24, 2023, the entire contents of which are incorporated herein by reference.

FIELD

Embodiments described herein generally relate to a printer apparatus.

BACKGROUND

Conventionally, for a heat-transfer printer apparatus that performs printing on a print sheet by heating an ink ribbon, a printer apparatus with a torque limiter for cancelling a conveying speed difference between an ink ribbon and a print sheet and winding up the ink ribbon while applying a predetermined tensile force to the ink ribbon has been proposed. In such a printer apparatus, the conveyance of the print sheet and the conveyance of the ink ribbon are performed with a driving force from another driving source.

However, in order to simplify the structure of the printer apparatus and achieve cost saving and power consumption reduction, the conveyance of the print sheet and the conveyance of the ink ribbon are performed with a driving force from a single driving source. In this case, when the print sheet and the ink ribbon after the printing are fed back to the next print start location, the ink ribbon is sometimes loosened due to the inertia force of a winding reel for the ink ribbon. When the next print is started in a state in which the ink ribbon is loosened, the ink ribbon is suddenly pulled. A large impact is transmitted to a nip region where the print sheet is held in contact with a platen roller. This lowers the print quality at the print start, which is problematic.

BRIEF DESCRIPTION OF THE DRAWINGS

FIG. 4 is a diagram showing an example of a result of assessing a relation between the type of elastic member and the print quality in the printer apparatus according to the first embodiment.

DETAILED DESCRIPTION

Figure 1:
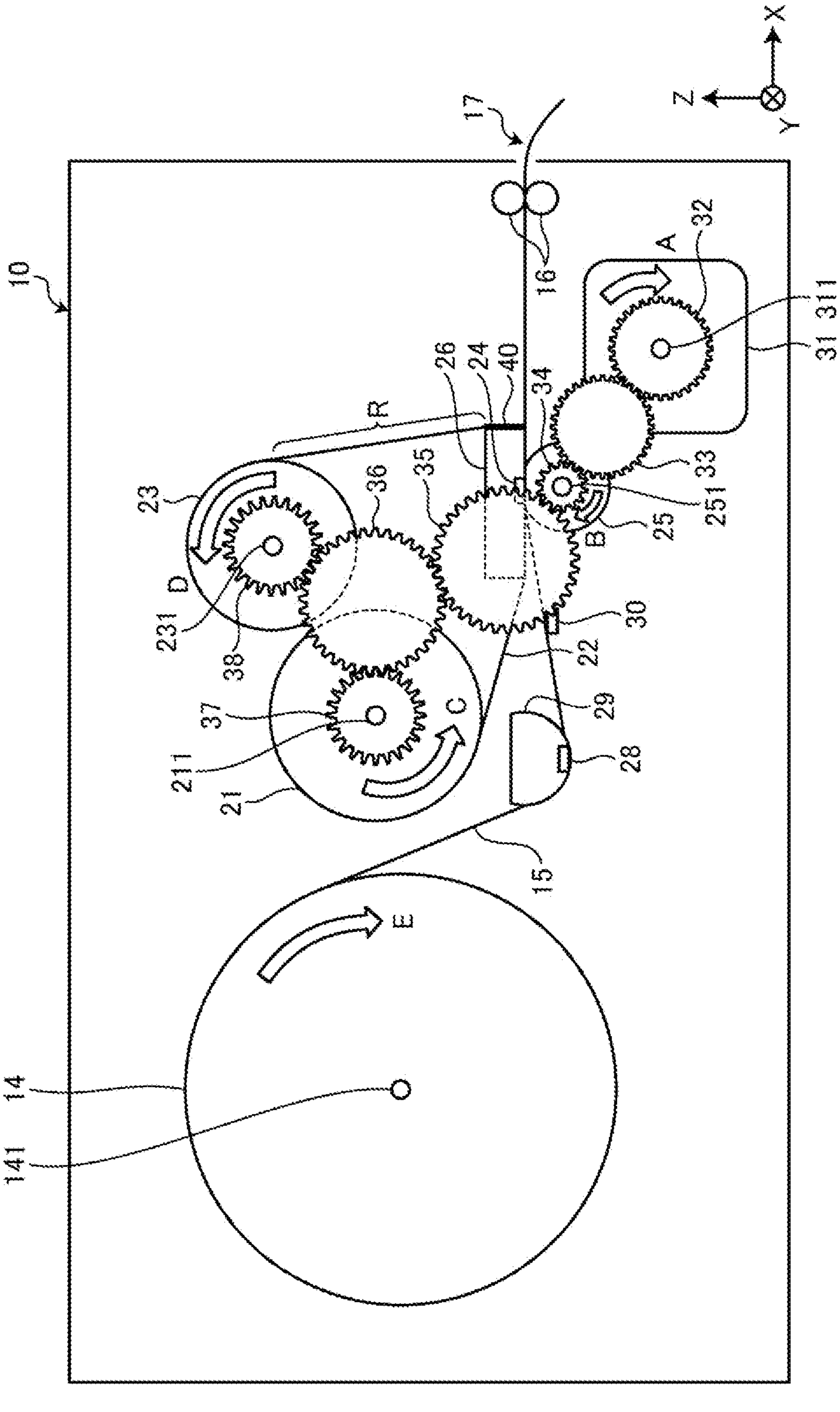
FIG. 1 is a diagram showing an example of a schematic configuration of a printer apparatus according to a first embodiment.

In accordance with one embodiment, a heat-transfer printer apparatus includes a single driving source, a print head, a platen roller, a winding reel, a guide member, and an elastic member. The single driving source generates a driving force for conveying a print sheet and an ink ribbon. The printing head performs printing on the print sheet conveyed by the driving force by heating the ink ribbon conveyed by the driving force. The platen roller is provided in opposite to the printing head and conveys the ink ribbon and the print sheet overlapping each other while nipping the ink ribbon and the print sheet between the platen roller and the printing head. The winding reel winds up the ink ribbon after the printing. The guide member guides the ink ribbon and the print sheet nipped by the printing head and the platen roller and guides only the ink ribbon after the printing towards the winding reel. The elastic member is attached to a surface of the guide member, the surface guiding only the ink ribbon towards the winding reel.

Hereinafter, embodiments will be described in detail with reference to the drawings. In the drawings, the same reference signs denote the same or similar portions. It should be noted that the embodiments are not limited by the following descriptions.

First Embodiment

First of all, a printer apparatus 10 as a first embodiment will be described.

(Schematic Configuration of Printer Apparatus)

Referring to FIG. 1, a schematic configuration of the printer apparatus 10 according to the first embodiment will be described. FIG. 1 is a diagram showing an example of a schematic configuration of the printer apparatus according to the first embodiment.

The printer apparatus 10 is a so-called thermal heat-transfer printer that performs printing on a print sheet 15 by heating an ink ribbon 22. The printer apparatus 10 performs printing while pulling out the print sheet 15 from roll paper 14, around which the print sheet 15 is wound in the form of a roll, in the arrow E direction. It should be noted that the roll paper 14 is rotatably supported around a shaft 141 along a Y-axis in FIG. 1.

The print sheet 15 is, for example, a label sheet or a tag sheet. The label sheet has a structure in which a plurality of same-size labels is arranged at predetermined intervals on a base sheet. The label may have an adhesive layer formed on its back surface and be attached to a base sheet which is release paper so that the label can be released from the base sheet. The tag sheet is, for example, thick paper used as a product price tag or a baggage tag.

The print sheet 15 pulled out from the roll paper 14 is put on a sheet guide 29, changes the direction, and overlaps the ink ribbon 22 pulled out in the arrow C direction from a ribbon roll 21. Then, the print sheet 15 is nipped by a thermal head 24 and a platen roller 25 rotating in the arrow B direction. Accordingly, a nip region where the thermal head 24, the ink ribbon 22, and the print sheet 15 are in contact is formed. It should be noted that the ribbon roll 21 is rotatably supported around an axis 211 along the Y-axis in FIG. 1. Moreover, the platen roller 25 is rotatably supported around a shaft 251 along the Y-axis in FIG. 1.

The thermal head 24 includes a plurality of heat elements. The thermal head 24 selectively heats the heat elements, thereby melting ink applied to the ink ribbon 22. Then, the molten ink is transferred to the print sheet 15. In this manner, for example, a desired characters or barcode is printed.

The thermal head 24 is supported on a surface of a head frame 26 along the X-axis direction. The head frame 26 guides the ink ribbon 22 and the print sheet 15 nipped by the thermal head 24 and the platen roller 25. Specifically, the surface of the head frame 26 along the X-axis direction is held in contact with a surface of the ink ribbon 22, which is not held in contact with the print sheet 15, and guides the ink ribbon 22 and the print sheet 15. The head frame 26 is an example of a guide member in the present embodiment.

The print sheet 15 after the printing is completed passes beyond the head frame 26, and then is guided by a pair of conveying rollers 16 and delivered from a delivery port 17. The print sheet 15 delivered from the delivery port 17 may be manually cut at the position of the delivery port 17 or may be cut by a cutter (not shown) placed near the delivery port 17.

On the other hand, the ink ribbon 22 after the printing is completed is guided towards a winding reel 23 by a side surface of the head frame 26 on a positive side on the X-axis. The side surface of the head frame 26 on the positive side on the X-axis extends in a Z-axis direction. In other words, the side surface on the positive side on the X-axis is a surface in a direction (Z-axis direction) perpendicular to a conveying direction for the ink ribbon guided by the surface along the X-axis direction. Therefore, the conveying direction for the ink ribbon 22 is changed upwards by about 90 degrees on the side surface. The winding reel 23 rotatably supported around a shaft 231 along the Y-axis in FIG. 1 winds up the ink ribbon 22 moved away from the head frame 26 by rotating in the arrow D direction. It should be noted that the ink ribbon 22 wound up by the winding reel 23 is held in contact with a point at which the ink ribbon 22 is spaced apart from the side surface of the head frame 26 irrespective of the amount of the ink ribbon 22 wound up by the winding reel 23. The details will be described later (see FIG. 2).

An ethylene propylene diene monomer (EPDM) rubber sheet 40 is attached to the side surface of the head frame 26 on the positive side on the X-axis. The EPDM rubber sheet 40 is a synthetic rubber obtained by co-polymerizing ethylene and propylene and is molded in the form of a sheet (in the form of a plane). The EPDM rubber sheet 40 is attached to the side surface of the head frame 26 with an adhesive or a double sided tape, for example. Therefore, the back side of the ink ribbon 22 (side not held in contact with the print sheet 15) moves to the winding reel 23 via a wind-up portion R shown in FIG. 1 while sliding with the EPDM rubber sheet 40. The EPDM rubber sheet 40 is an example of an elastic member in the present embodiment. It should be noted that the EPDM rubber sheet 40 may be replaced by another elastic member having substantially the same hardness and thickness as the EPDM rubber sheet 40.

It should be noted that a single driving motor 31 performs the conveyance of the print sheet 15 and the conveyance of the ink ribbon 22. It should be noted that the driving motor 31 is an example of a driving source in the present embodiment.

Specifically, when the driving motor 31 positively rotates, a driving gear 32 directly coupled to an output shaft 311 of the driving motor 31 rotates in the arrow A direction. The rotation of the driving gear 32 is transmitted to a platen roller driving gear 34 directly coupled to the shaft 251 of the platen roller 25 via a coupling gear 33 meshing with the driving gear 32.

The rotation of the platen roller driving gear 34 is transmitted to a coupling gear 36 meshing with the coupling gear 35 via a coupling gear 35 meshing with the platen roller driving gear 34.

A ribbon roll driving gear 37 and a winding reel driving gear 38 mesh with the coupling gear 36. Therefore, along with rotation of the platen roller 25 in the arrow B direction, the ribbon roll 21 rotates in the arrow C direction and the winding reel 23 rotates in the arrow D direction.

The platen roller driving gear 34 rotates the platen roller 25 in the arrow B direction. Then, with the rotation of the platen roller 25, the printing is performed while the print sheet 15 and the ink ribbon 22 nipped by the platen roller 25 and the thermal head 24 are conveyed in a positive direction on the X-axis. It should be noted that the diameter and the number of teeth for each gear are set so that the conveying speed for the ink ribbon 22 is equal to or higher than that for the platen roller 25 in order not to loosen the ink ribbon 22 when the printing is performed.

When the printing on the print sheet 15 is completed, the print sheet 15 is further conveyed (fed) in the positive direction on the X-axis and delivered from the delivery port 17. Moreover, the ink ribbon 22 is wound up by the winding reel 23.

The printed print sheet 15 delivered from the delivery port 17 is cut, and then the printer apparatus 10 performs backfeed for returning the print sheet 15 to the next print start location. At this time, the driving motor 31 rotates in a direction opposite to the direction when performing the printing. That is, the driving gear 32 rotates in a direction opposite to the arrow A.

By the rotation the driving gear 32 being transmitted to the respective gears described above, the platen roller 25, the ribbon roll 21, and the winding reel 23 all rotate in the direction opposite to the direction when performing the printing. Accordingly, the print sheet 15 and the ink ribbon 22 are conveyed in a negative direction on the X-axis.

In order to determine a suitable print timing, the printer apparatus 10 includes a label gap detection sensor 28 and a tag sheet detection sensor 30 for detecting the position of the print sheet 15.

The label gap detection sensor 28 is a transmissive optical sensor. In a case where a label sheet is used as the print sheet 15, the label gap detection sensor 28 detects a timing mark shown at a label gap position on the back side on a print surface of the label sheet.

The tag sheet detection sensor 30 is a reflective optical sensor. In a case where a tag sheet is used as the print sheet 15, the tag sheet detection sensor 30 detects a timing mark shown at the back of a print surface of the tag sheet.

Those sensors operate in accordance with the type of print sheet 15, which is set before the print start.

(Behaviors of Ink Ribbon During Backfeed)

Figure 2:
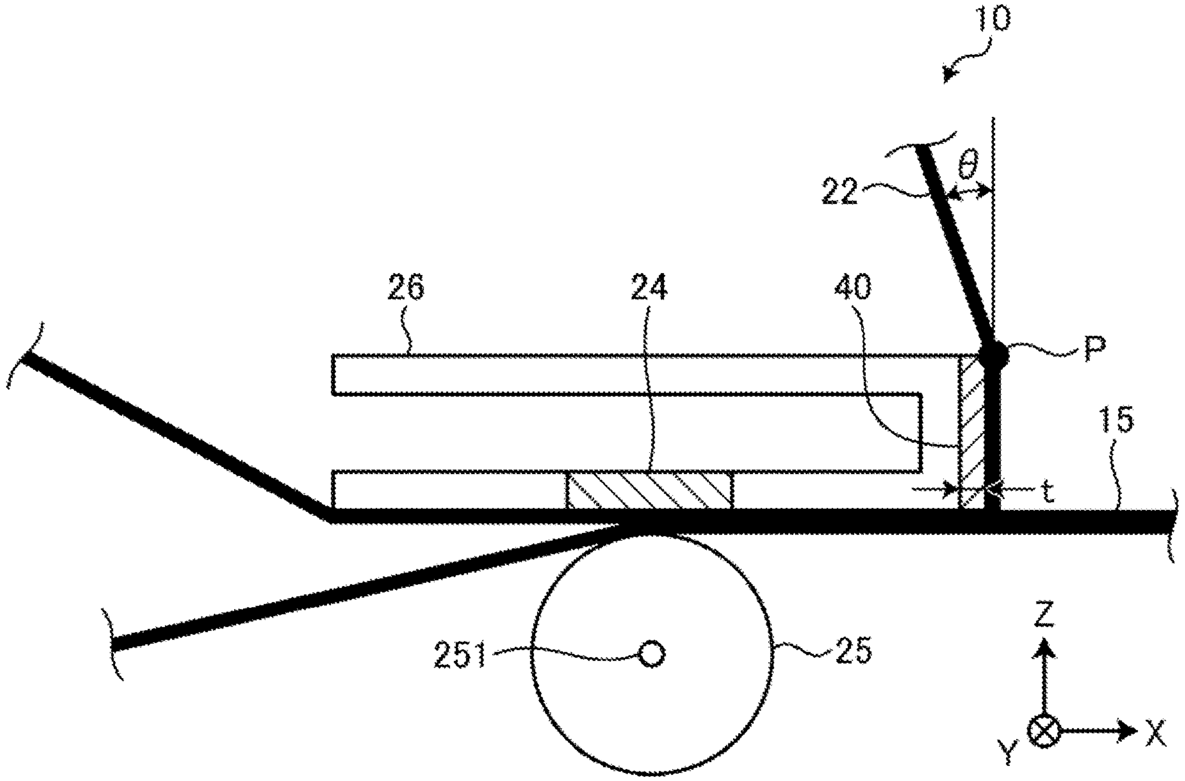
FIG. 2 is a first diagram showing an example of a detailed structure in the periphery of a head frame in the printer apparatus according to the first embodiment.
Figure 3:
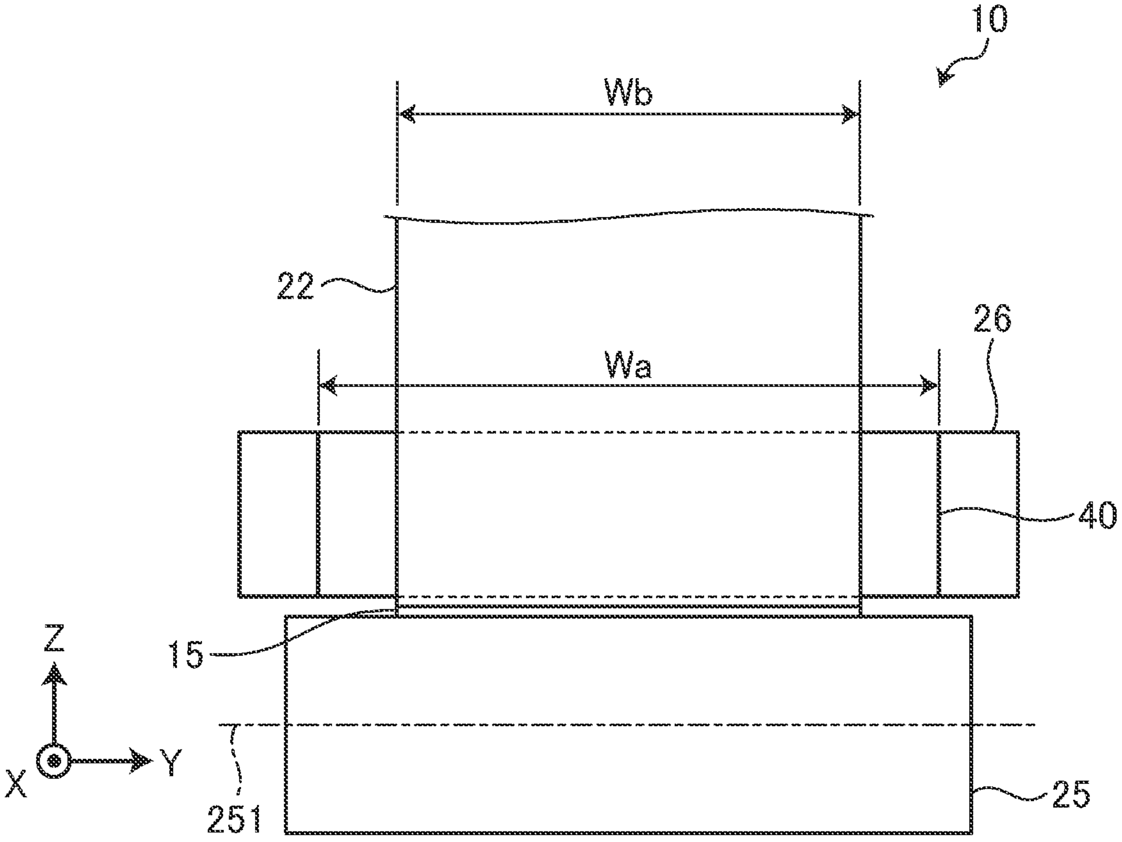
FIG. 3 is a second diagram showing an example of a detailed structure in the periphery of the head frame in the printer apparatus according to the first embodiment.

Next, behaviors of the ink ribbon 22 when the printer apparatus 10 performs backfeed will be described with reference to FIGS. 2 and 3. FIG. 2 is a first diagram showing an example of a detailed structure in the periphery of the head frame 26 in the printer apparatus 10 according to the first embodiment. FIG. 3 is a second diagram showing an example of a detailed structure in the periphery of the head frame 26 in the printer apparatus 10 according to the first embodiment.

First of all, referring to FIG. 2, the wind-up path for the ink ribbon 22 will be described in more detail. The ink ribbon 22 after the printing is conveyed in the positive direction on the X-axis along the head frame 26, changes the direction upwards by substantially 90 degrees, and is conveyed in a positive direction on the Z-axis along the EPDM rubber sheet 40. At that time, the ink ribbon 22 is conveyed while sliding on the surface of the EPDM rubber sheet 40. Then, the ink ribbon 22 changes the direction by an angle of refraction θ at a point P and moves towards the winding reel 23 (see FIG. 1). The angle of refraction θ is an angle of refraction with respect to the conveying direction for the ink ribbon guided by the side surface in the positive direction on the X-axis. The point P is a position spaced apart from the side surface of the head frame 26 by a rubber thickness t of the EPDM rubber sheet 40. Although the angle of refraction θ depends on the amount of the ink ribbon 22 wound up by the winding reel 23, a positional relation between the shaft 231 of the winding reel 23 and the head frame 26 is set so that θ>0 degrees is constantly established irrespective of the amount of the ink ribbon 22 wound up by the winding reel 23. Therefore, the ink ribbon 22 is constantly pushed against the point P.

When the ink ribbon 22 is backfed, there is a case where the ink ribbon 22 is not uniformly rewound in the region of the wind-up portion R shown in FIG. 1 because of clearances (backlash) provided in portions where the above-mentioned various gears mesh each other. In such a case, the ink ribbon 22 is loosened in the wind-up portion R. In particular, when the backfeed is performed in a case where the amount of ink ribbon 22 wound up around the winding reel 23 is larger, the ink ribbon 22 is more easily loosened because the inertia force of the winding reel 23 increases as compared to a case where the amount of ink ribbon 22 wound-up is smaller.

If the next print is started in a state in which the ink ribbon 22 is loosened in the wind-up portion R in this manner, the loosened ink ribbon 22 is suddenly pulled, and a large impact is transmitted to the nip region where the thermal head 24, the ink ribbon 22, and the print sheet 15 are in contact. Therefore, blurry printing, faint printing, etc. may occur at the print start, which lowers the print quality.

With the EPDM rubber sheet 40 attached to the head frame 26 in the printer apparatus 10 according to the present embodiment, an impact generated when the loosened ink ribbon 22 is suddenly pulled at the print start is absorbed by an elastic force of the EPDM rubber sheet 40. Since this can reduce the impact transmitted to the nip region, lowering of the print quality can be prevented.

As shown in FIG. 3, a width Wa of the EPDM rubber sheet 40 in a direction orthogonal to the conveying direction for the ink ribbon 22 is set to be larger than a width Wb of the ink ribbon 22. In other words, both end portions of the EPDM rubber sheet 40 project from both end portions of the ink ribbon 22 in the width direction. Accordingly, the entire surface of the ink ribbon 22 is held in contact with the EPDM rubber sheet 40 on the side surface of the head frame 26.

With such a configuration, the ink ribbon 22 can be slid in a state in which the back surface of the ink ribbon 22 is reliably held in contact with the EPDM rubber sheet 40 even if the ink ribbon 22 is meandering.

(Design Conditions for EPDM Rubber Sheet)

Referring to FIG. 4, suitable design conditions for the EPDM rubber sheet 40 will be described. FIG. 4 is a diagram showing an example of a result of assessing a relation between the type of elastic member and the print quality.

Primary design parameters for the EPDM rubber sheet 40 used in the printer apparatus 10 according to the present embodiment are rubber hardness H and the rubber thickness t.

The rubber hardness H is measured by pushing a measurement tool called durometer against a test sample and measuring how far an indenter travels in the test sample with a constant force applied on the indenter. The measurement result is expressed by degrees. The smaller the degrees are, the softer the test sample is. For example, hardness 100 degrees indicates hardness like a glass and a general rubber hardness ranges from approximately 40 degrees to 70 degrees.

The rubber thickness t is the thickness of the EPDM rubber sheet 40.

The inventor of the present embodiment assessed the print quality of the printer apparatus 10 by using a plurality of EPDM rubber sheets 40 different in the rubber hardness H and the rubber thickness t. Moreover, the inventor compared it with the print quality with no EPDM rubber sheet 40. FIG. 4 shows an example of assessment results.

As results of assessment, the inventor has found that it is desirable that the rubber hardness H of the EPDM rubber sheet 40 ranges from 45 degrees to 65 degrees.

The inventor has found that in a case where the rubber hardness H is lower (softer) than 45 degrees, silicon applied to the back of the ink ribbon 22 in order to improve its sliding ability sticks to the surface of the EPDM rubber sheet 40. Further, the inventor has found that the silicon sticking to the surface of the EPDM rubber sheet 40 makes the EPDM rubber sheet 40 slipperier, which reduces the impact absorbing effect when the ink ribbon 22 is suddenly pulled, applying a high tensile force, and leads to lowering of the print quality.

On the other hand, the inventor has found that in a case where the rubber hardness H is higher (harder) than 65 degrees, it reduces the impact absorbing effect when the ink ribbon 22 is suddenly pulled, applying a high tensile force, and leads to lowering of the print quality.

Moreover, as results of assessment, the inventor has found that it is desirable that the rubber thickness t of the EPDM rubber sheet 40 range from 0.5 mm to 2.0 mm.

Since a too small rubber thickness t lowers the durability, it is desirable that the thickness be at least equal to or larger than 0.5 mm. On the other hand, if the rubber thickness t of the EPDM rubber sheet 40 is larger than 2.0 mm, the ink ribbon 22 largely deflects the EPDM rubber sheet 40 when a tensile force is applied to the ink ribbon 22 in a region where the rubber hardness H of the EPDM rubber sheet 40 is smaller (softer). Then, the ink ribbon 22 held in contact with the thermal head 24 is pulled, which leads to lowering of the print quality. Moreover, the inventor has found that regarding a region where the rubber thickness t is equal to or larger than 2.0 mm, it is a combined region where a relation between the rubber thickness t and the hardness of the EPDM rubber sheet 40 is unstable, so the rubber thickness t is desirably equal to or smaller than 2.0 mm.

Actions and Effects of First Embodiment

As described above, the printer apparatus 10 according to the embodiment is a heat-transfer printer apparatus with the thermal head 24 (printing head) that performs printing on the print sheet 15 by heating the ink ribbon 22, including the single driving motor 31 (driving source), the head frame 26 (guide member), and the EPDM rubber sheet 40 (elastic member). The single driving motor 31 generates a driving force for conveying the print sheet 15 and the ink ribbon 22. Moreover, the head frame 26 supports the thermal head 24 and guides the ink ribbon 22 and the print sheet 15 nipped by the thermal head 24 and the platen roller 25 and guides the ink ribbon 22 after the printing towards the winding reel 23. Moreover, the EPDM rubber sheet 40 is a sheet-like member attached to a surface of the side surfaces of the head frame 26, which are held in contact with the ink ribbon 22, the surface guiding the ink ribbon 22 after the printing towards the winding reel 23. Therefore, the EPDM rubber sheet 40 absorbs the impact when the ink ribbon 22 is suddenly pulled at the print start. Therefore, lowering of the print quality due to the ink ribbon 22 loosened during the backfeed can be prevented with a simple structure.

Moreover, in the printer apparatus 10 according to the embodiment, the width Wa of the EPDM rubber sheet 40 (elastic member) in the direction orthogonal to the conveying direction for the ink ribbon 22 is larger than the width Wb of the ink ribbon 22. Therefore, the ink ribbon 22 can be slid in a state in which the back surface of the ink ribbon 22 is reliably held in contact with the EPDM rubber sheet 40 even if the ink ribbon 22 is meandering.

Moreover, in the printer apparatus 10 according to the embodiment, the rubber hardness H of the EPDM rubber sheet 40 (elastic member) ranges from 45 degrees to 60 degrees, and the rubber thickness t of the EPDM rubber sheet 40 (elastic member) ranges from 0.5 mm to 2.0 mm. Therefore, lowering of the print quality due to the ink ribbon 22 loosened during the backfeed can be prevented.

Moreover, in the printer apparatus 10 according to the embodiment, the elastic member is the EPDM rubber sheet 40. Therefore, since the EPDM rubber sheet 40 absorbs the impact when the ink ribbon 22 is suddenly pulled at the print start. Thus, lowering of the print quality due to the ink ribbon 22 loosened during the backfeed can be prevented with a simple structure.

Second Embodiment

Next, a printer apparatus 11 as a second embodiment will be described.

(Schematic Configuration of Printer Apparatus)

Figure 5:
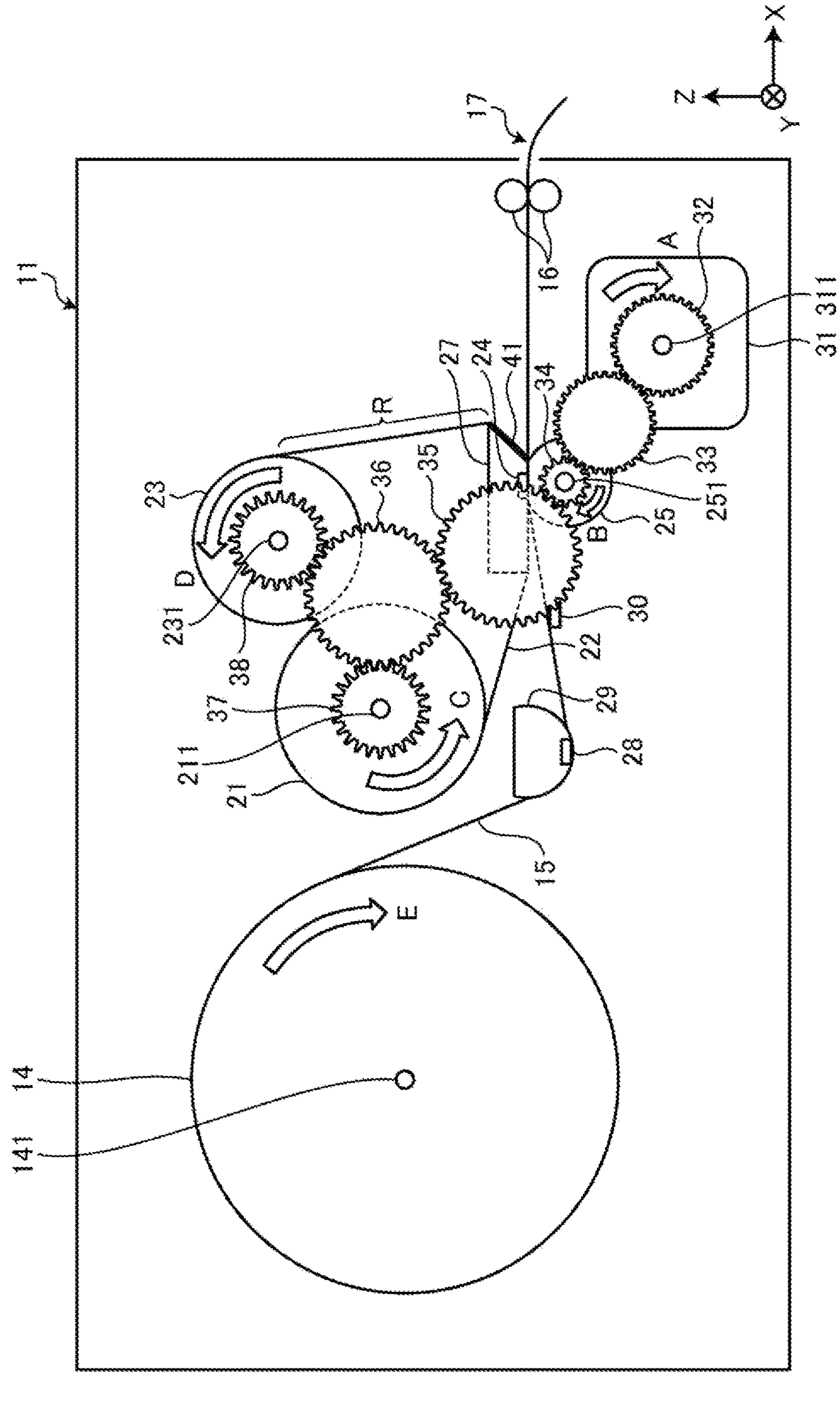
FIG. 5 is a diagram showing an example of a schematic configuration of a printer apparatus according to a second embodiment.

FIG. 5 is a diagram showing an example of a schematic configuration of the printer apparatus according to the second embodiment. The printer apparatus 11 shown in FIG. 5 includes a head frame 27 instead of the head frame 26 of the printer apparatus 10 described above in the first embodiment. It should be noted that operations of the respective parts of the printer apparatus 11 are similar to those of the printer apparatus 10 described above, so duplicate descriptions will be omitted and only differences from the printer apparatus 10 will be described below.

The head frame 27 keeps the thermal head 24 in contact with the platen roller 25. The head frame 27 is an example of the guide member in the present embodiment.

The ink ribbon 22 after the printing is completed is guided by a side surface of the head frame 27 on a positive side on the X-axis and moves towards the winding reel 23. The side surface on the positive side on the X-axis is a surface tilting in a conveying direction for the ink ribbon 22 from a surface in a direction (Z-axis direction) perpendicular to a conveying direction for the ink ribbon conveyed while being guided by the surface along the X-axis direction. On the side surface on the positive side on the X-axis, the conveying direction for the ink ribbon 22 is changed to obliquely upper right in FIG. 5. The winding reel 23 rotatably supported around a shaft 231 along the Y-axis in FIG. 5 winds up the ink ribbon 22 moved away from the head frame 27 by rotating in the arrow D direction. It should be noted that the ink ribbon 22 wound up by the winding reel 23 is held in contact with a point at which the ink ribbon 22 is spaced apart from the side surface of the head frame 27 irrespective of the amount of the ink ribbon 22 wound up by the winding reel 23. The details will be described later (see FIG. 6).

An EPDM rubber sheet 41 is attached to the side surface of the head frame 27 on the positive side on the X-axis. The EPDM rubber sheet 41 is molded in the form of a sheet (in the form of a plane). The EPDM rubber sheet 41 is attached to the side surface of the head frame 27 with an adhesive, for example. Therefore, the back side of the ink ribbon 22 (side not held in contact with the print sheet 15) moves towards the winding reel 23 via a wind-up portion R shown in FIG. 5 while sliding with the EPDM rubber sheet 41. The EPDM rubber sheet 41 is an example of the elastic member in the present embodiment.

Which direction the side surface of the head frame 26 in the first embodiment or the side surface of the head frame 27 in the second embodiment is oriented only needs to be determined depending on the positional relation between the head frame and the winding reel 23 in the printer apparatus. That is, as to the direction of the side surface of the head frame, it is sufficient to form it in such a direction that the ink ribbon 22 wound up by the winding reel 23 is constantly held in contact with the point spaced apart from the side surface of the head frame irrespective of the amount of the ink ribbon 22 wound up by the winding reel 23.

(Behaviors of Ink Ribbon During Backfeed)

Figure 6:
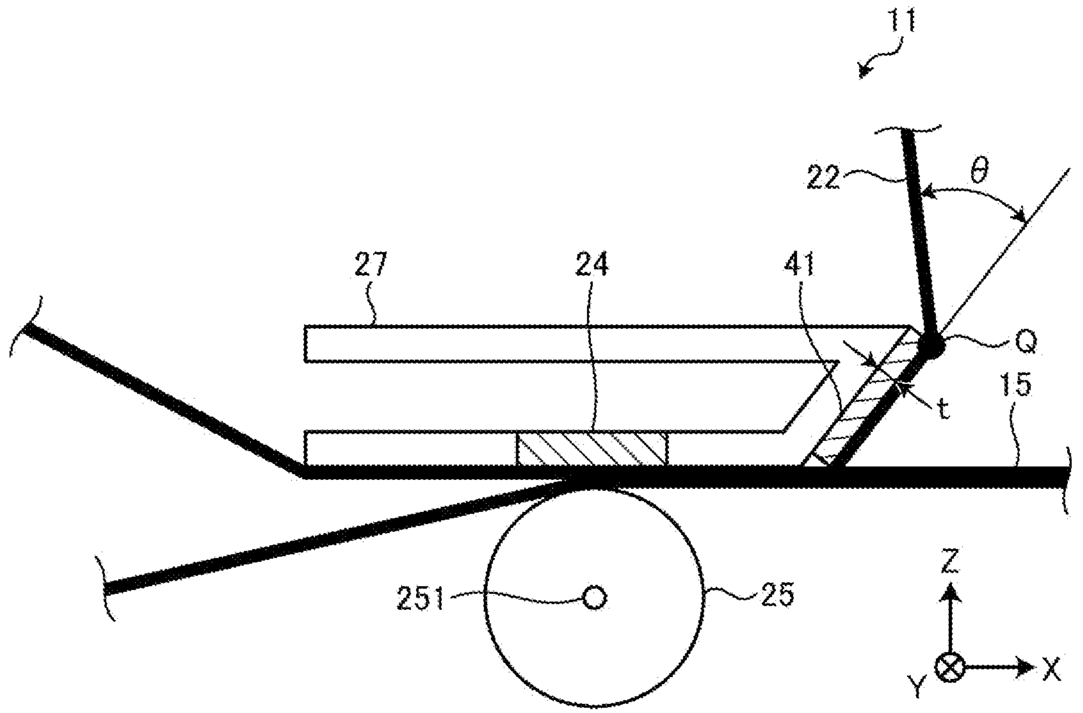
FIG. 6 is a diagram showing an example of a detailed structure in the periphery of a head frame in the printer apparatus according to the second embodiment.

Next, behaviors of the ink ribbon 22 when the printer apparatus 11 performs backfeed will be described with reference to FIG. 6. FIG. 6 is a diagram showing an example of a detailed structure in the periphery of the head frame 27 in the printer apparatus according to the second embodiment.

Referring to FIG. 6, the wind-up path for the ink ribbon 22 will be described in more detail. The ink ribbon 22 after the printing is conveyed in the positive direction on the X-axis along the head frame 26, changes the direction to obliquely upper right in FIG. 6, and is conveyed in a positive direction on the Z-axis along the EPDM rubber sheet 41. At that time, the ink ribbon 22 is conveyed while sliding on the surface of the EPDM rubber sheet 41. Then, the ink ribbon 22 changes the direction by an angle of refraction θ at a point Q and moves towards the winding reel 23 (see FIG. 5). The angle of refraction θ is an angle of refraction with respect to the conveying direction for the ink ribbon guided by the side surface in the positive direction on the X-axis. The point P is a position spaced apart from the side surface of the head frame 26 by a rubber thickness t of the EPDM rubber sheet 40. The point Q is a position spaced apart from the side surface of the head frame 27 by the rubber thickness t of the EPDM rubber sheet 41. Although the angle of refraction θ depends on the amount of the ink ribbon 22 wound up by the winding reel 23, a positional relation between the shaft 231 of the winding reel 23 and the head 27 is set so that $\theta > 0$ degrees is constantly established irrespective of the amount of the ink ribbon 22 wound up by the winding reel 23. Therefore, the ink ribbon 22 is constantly pushed against the point Q.

When the ink ribbon 22 is backfed, there is a case where the ink ribbon 22 is not uniformly rewound in the region of the wind-up portion R shown in FIG. 5 because of clearances (backlash) provided in portions in which the above-mentioned various gears mesh each other. In such a case, the ink ribbon 22 is loosened in the wind-up portion R. Moreover, when the backfeed is performed in a case where the amount of ink ribbon 22 wound up around the winding reel 23 is larger, the inertia force of the winding reel 23 increases. Therefore, the ink ribbon 22 is more easily loosened as compared to a case where the amount of ink ribbon 22 wound-up is smaller.

If the next print is started in a state in which the ink ribbon 22 is loosened in the wind-up portion R in this manner, the loosened ink ribbon 22 is suddenly pulled. Therefore, a large impact is transmitted to the nip region where the thermal head 24, the ink ribbon 22, and the print sheet 15 are in contact. Accordingly, blurry printing, faint printing, etc. may occur, which lowers the print quality.

Actions and Effects of Second Embodiment

As described above, with the EPDM rubber sheet 41 attached to the head frame 27 in the printer apparatus 11 according to the present embodiment, an impact generated when the loosened ink ribbon 22 is suddenly pulled at the print start is absorbed by an elastic force of the EPDM rubber sheet 41. Since this can reduce the impact transmitted to the nip region, lowering of the print quality can be prevented.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A heat-transfer printer apparatus, comprising:

a single driving source that generates a driving force for conveying a print sheet and an ink ribbon;

a printing head that performs printing on the print sheet conveyed by the driving force by heating the ink ribbon conveyed by the driving force;

a platen roller that is provided in opposite to the printing head and conveys the ink ribbon and the print sheet overlapping each other while nipping the ink ribbon and the print sheet between the platen roller and the printing head;

a winding reel around which the ink ribbon is wound after the printing;

a guide member that has a first part with which the ink ribbon and the print sheet nipped by the printing head and the platen roller are guided and a second part with which only the ink ribbon after the printing is guided towards the winding reel; and a sheet-like elastic member attached to the second part of the guide member, wherein a surface of the sheet-like elastic member extends in a first direction towards the winding reel, and the ink ribbon guided with the second part of the guide member is aligned in the first direction and is in surface contact with the surface of the sheet-like elastic member.

2. The heat-transfer printer apparatus according to claim 1, wherein the guide member supports the printing head in the first part.

3. The heat-transfer printer apparatus according to claim 1, wherein the surface of the sheet-like elastic member is not in contact with the print sheet, and the ink ribbon is guided towards the winding reel while sliding on the surface of the sheet-like elastic member.

4. The heat-transfer printer apparatus according to claim 1, wherein a surface of the second part of the guide member to which the sheet-like elastic member is attached is perpendicular to a conveying direction for the ink ribbon conveyed while being guided by the first part of the guide member.

5. The heat-transfer printer apparatus according to claim 1, wherein a surface of the second part of the guide member to which the sheet-like elastic member is attached is tilting from a direction perpendicular to a conveying direction for the ink ribbon conveyed while being guided by the first part of the guide member.

6. The heat-transfer printer apparatus according to claim 1, wherein the ink ribbon after passing the surface of the sheet-like elastic member is directed in a second direction that is angled with respect to the first direction.

7. The heat-transfer printer apparatus according to claim 1, wherein a width of the sheet-like elastic member in a direction orthogonal to a conveying direction for the ink ribbon is larger than a width of the ink ribbon in the direction orthogonal to the conveying direction.

8. The heat-transfer printer apparatus according to claim 1, wherein the sheet-like elastic member has rubber hardness of from 45 degrees to 60 degrees and a thickness of from 0.5 mm to 2.0 mm.

9. The heat-transfer printer apparatus according to claim 8, wherein the sheet-like elastic member includes ethylene propylene rubber.

10. The heat-transfer printer apparatus according to claim 1, wherein the print sheet is a rolled sheet set in the heat-transfer printer apparatus and a unwound part of the rolled sheet is conveyed with the driving force.

11. The heat-transfer printer apparatus according to claim 1, wherein the single driving source is configured to generate a first driving force for conveying the print sheet and the ink ribbon in a forward conveying direction and a second first driving force for conveying the print sheet and the ink ribbon in a backward conveying direction opposite to the forward conveying direction.

* * * * *